Oct. 13, 1959  H. O. CAMPBELL ET AL  2,908,890
SEISPHONE AND CABLE ASSEMBLY
Filed June 27, 1955  3 Sheets-Sheet 1

INVENTORS.
HOLLIS O. CAMPBELL
ANTHONY P. LIPSKI
BY
Jerry J. Dunlap
ATTORNEY

INVENTORS.
HOLLIS O. CAMPBELL
ANTHONY P. LIPSKI
BY
Jerry J. Dunlap
ATTORNEY

United States Patent Office 2,908,890
Patented Oct. 13, 1959

2,908,890

SEISPHONE AND CABLE ASSEMBLY

Hollis O. Campbell and Anthony P. Lipski, Ponca City, Okla., assignors to Continental Oil Company, Ponca City, Okla., a corporation of Delaware Application June 27, 1955, Serial No. 518,154

8 Claims. (Cl. 340—17)

This invention relates to improvements in vibration detectors for use in seismic exploration.

As it is well known in the art, the usual seisphone or detector utilizes a permanent magnet core having two coils resiliently supported in an air gap around the core. Ordinarily, the coils are wound in a reverse manner and are connected in series to eliminate the action of external electromagnetic fields caused by power lines and the like. In this arrangement, the coils are not only subject to sticking, thus frequently rendering the detectors inoperative, but the double coil construction is expensive to manufacture. Also, the permanent magnet core is usually magnetized along the axis of the core, whereby the magnetic flux tends to be dispersed along the magnet. To control the flux, ring-like pole plates are commonly secured around the magnet to reduce the thickness of the air gap and provide a flux concentration in the area of operation of the coils. As a result, the detector construction is unduly complicated and requires a substantial amount of machine work to obtain the desired clearances for an efficient operation of the coils.

The present invention contemplates a novel seisphone having a single coil and a controlled magnetic flux, wherein the working parts are held to a minimum and the seisphone is sensitive to minute vibrations. The use of a single moving coil simplifies the construction and substantially reduces the possibility of the coil becoming stuck in the seisphone. Also, the present invention contemplates a plurality of seisphones interconnected in such a manner as to eliminate the noise caused by power lines and ground currents. Furthermore, this invention contemplates a novel protective case and cable construction for seisphones, whereby the seisphones will be protected from adverse weather and can be handled in a rough manner without damage to the internal structure of the phones.

An important object of this invention is to provide a simply constructed seisphone which may be economically manufactured.

Another object of this invention is to provide a seisphone having a controlled magnetic circuit whereby the magnetic flux is concentrated in the desired area and the seisphone is highly sensitive.

Another object of this invention is to provide an array or plurality of detectors which are insensitive to external electromagnetic fields generated by power lines and the like, as well as the influence of ground currents.

A further object of this invention is to provide a sturdily constructed seisphone and protective case which will withstand rough handling in the field.

Another object of this invention is to provide a seisphone protective case formed integrally with its interconnecting cable, whereby the seisphones may be handled by pulling on the connecting cable without damage to the seisphone case or seisphones per se.

A still further object of this invention is to provide a moisture-proof seisphone case which will withstand substantially all adverse weather conditions.

Another object of this invention is to provide a seisphone protective case which may be easily and conveniently opened for repair or inspection of the seisphone structure, yet will remain in a closed condition during operation and handling of the seisphone in the field.

Other objects and advantages of this invention will be evident from the following detailed description, when taken in conjunction with the accompanying drawings which illustrate our invention.

Figure 2:
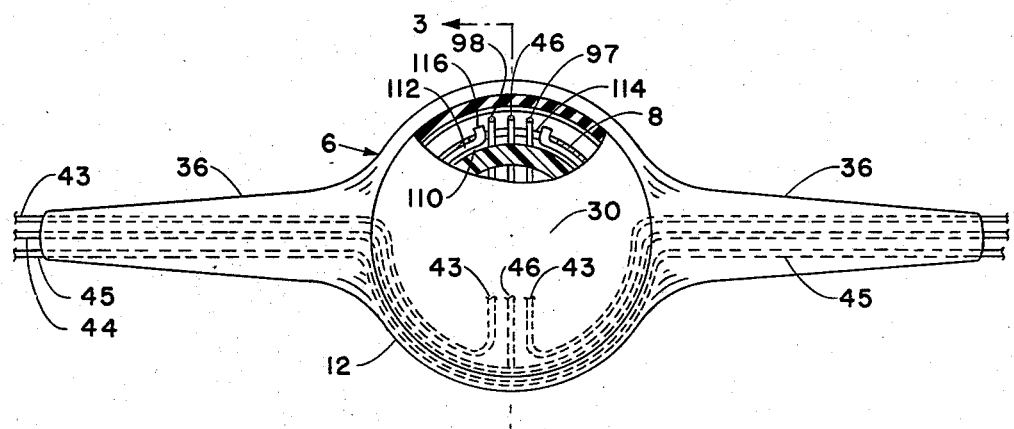
Figure 2 is a plan view of the seisphone and protective case with a portion of the case again shown in section.
Figure 1:
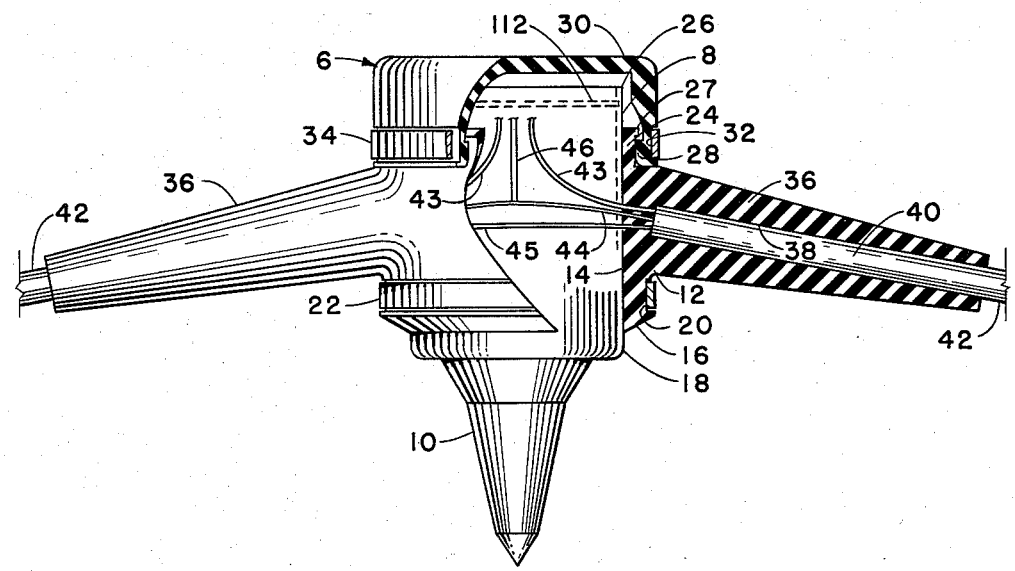
Figure 1 is an elevational view of our novel seisphone and protective case with a portion of the case shown in section to illustrate the details of construction.

Referring to the drawings in detail, and particularly Figures 1 and 2, reference character 6 generally designates our novel seisphone, which comprises a cylindrically shaped hollow housing 8 formed of a light-weight material, such as aluminum. The housing 8 has a tapered projection 10 on the lower end thereof forming a spike for insertion in the ground to anchor or couple the seisphone 6 to the earth. A protective case 12, formed of pliable material and having a bore 14 extending vertically therethrough, is secured around the housing 8 with the walls of the bore 14 in close contact with the housing 8. A suitable vulcanizing cement is preferably applied around the bore 14 to secure the case 12 on the housing 8. The lower end 16 of the case 12 is tapered downwardly and inwardly toward the lower end 18 of the main body portion of the housing 8. The tapered end 16 of the case 12 will not be easily distorted by sticks and stones, and reduces the possibility of accidental removal of the protective casing 12 from the housing 8. A circumferential groove 20 is formed in the outer periphery of the case 12 adjacent the lower tapered end 16 to receive a metal ring or band 22. The band 22 is press fitted in the groove 20 to additionally secure the casing 12 on the housing 8.

The upper end 24 of the case 12 is positioned in downwardly spaced relation to the upper end 26 of the housing 8 and is provided with an outwardly extending circumferential lip or shoulder 27. The lip 27 is engaged by a mating shoulder or lip 28 formed on the inner periphery of the lower end of a cap member 30. The cap 30 is preferably formed out of the same material as the case 12 to protect the upper end 26 of the housing 8. Also, the cap 30 is preferably sealed around the top of the case 12 by a suitable water-repellant. A circumferential groove 32 is formed in the outer periphery of the cap 30 in approximately horizontally aligned relation with the shoulder 28 to receive another clamping band or ring 34. The band 34 is press fitted in the groove 32 to retain the shoulder 28 below the lip 27 of the casing 12, thereby securing the cap 30 on the case 12. Since the cap 30 is formed out of a pliable material, the band 34 may be removed, that is, moved upwardly on the cap 30 by the use of a prying instrument, such as a screw driver or the like (not shown). However, substantial force is required to remove the band 34, therefore, the cap 30 will be retained on the case 12 during normal handling of the seisphone 6.

A pair of arms 36 extend outwardly from opposite sides of the case 12 and are provided with bores 38 extending partially therethrough. Each bore 38 extends from the outer end of the respective arm 36 to a point in proximity with the bore 14 of the case 12 to receive the end portion 40 of a connecting cable 42. The cables 42 are coated with a pliable material of substantially the same properties as the case 12 and arms 36, and each cable 42 is preferably bonded in the respective arm 36 by a vulcanizing process or the like. A preferred form of making the case 12 and arms 36 is to insert the cables 42 in a suitable mold, then mold rubber in the form shown for the case 12 and arms 36. In this manner, the arms 36 are molded on the cables 42 to provide a tight bond. Also fabric re-enforcing (not shown) may be used in the case 12 and arms 36, if desired.

It will also be observed that each arm 36 is progressively reduced in diameter from its inner end towards its outer end to provide substantial strength in the arms 36 at their connection with the case 12. It will be understood that the arms 36 are molded integrally with the main body portion of the case 12. Therefore, the cables 42 will be firmly secured to the case 12 and the case 12 may be readily picked up by pulling on the cables 42 without damage to either the cables or the protective case. Another feature to be noted is that the arms 36 are slanted downwardly toward their outer ends to reduce the effect of wind on the seisphone 6.

Each of the cables 42 contains three conductors 43, 44, and 45. The conductor 45 is a continuous conductor and is preferably imbedded in the wall of the case 12 as illustrated in Figure 2. Thus, the conductor 45 has no contact with the housing 8 and its contents and may be called the return conductor for the seisphone 6. However, when a plurality of seisphones 6 are connected in series for seismic exploration, the conductor 45 extends into the bore 14 of the case 12 of the outermost seisphone for connection with the internal structure of the outermost seisphone 6, as will be more fully hereinafter set forth. The conductor 44 is the ground for the seisphone 6 and may also be considered as a continuous conductor extending between and through the cables 42. However, the conductor 44 has a branch line or lead 46 extending into the housing 8 for connection with the internal structure of the seisphone 6. The conductors 43 extend into the bore 14 of the case 12 and then into the housing 8 for connection with the internal structure of the seisphone 6, as will now be described.

Figure 3:
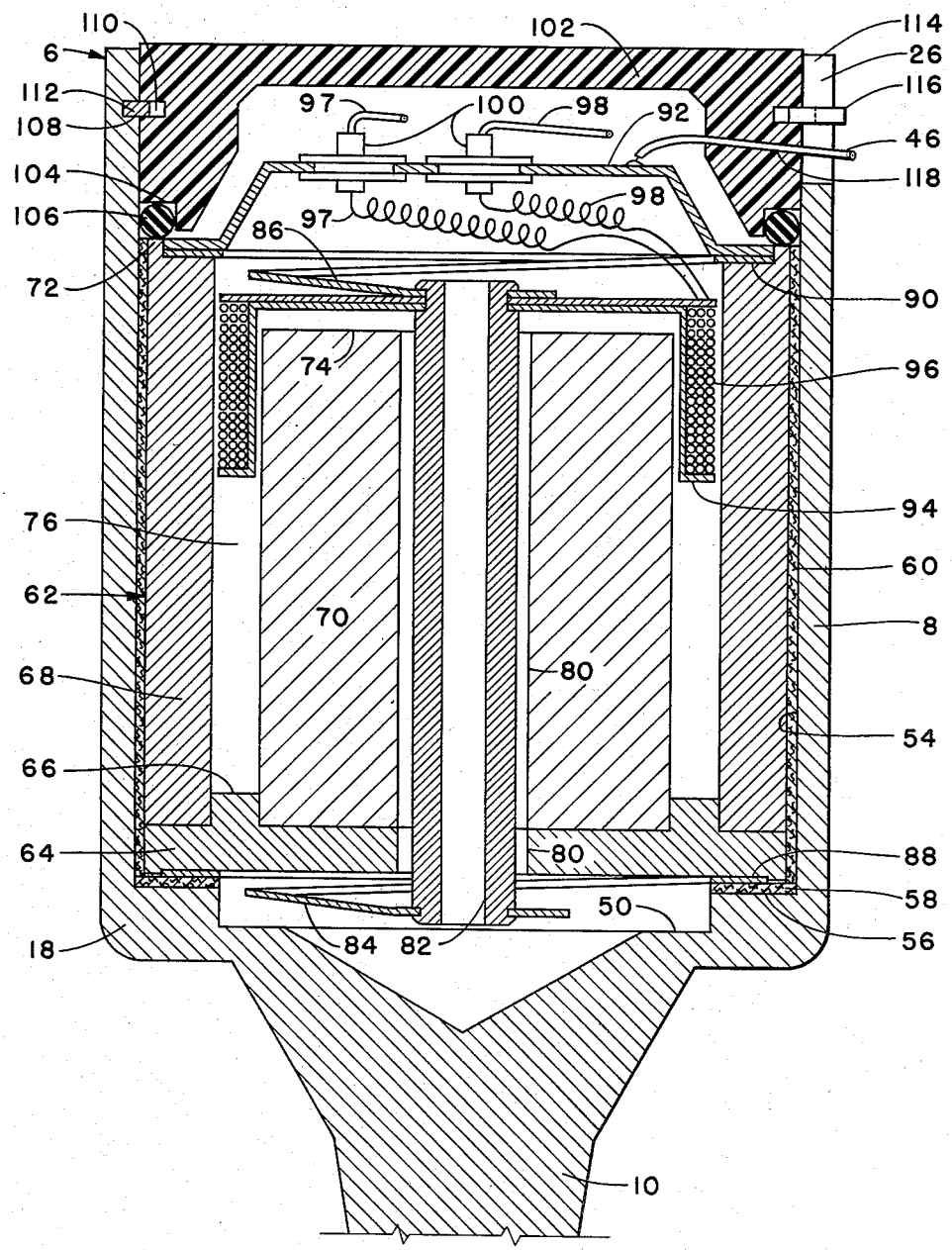
Figure 3 is an enlarged vertical sectional view through our novel seisphone, with the protective case removed, as taken along lines 3—3 of Figure 2.

Referring to Figure 3, it will be observed that a counterbore 50 is formed in the lower end 18 of the housing 8 concentrically with the larger bore 54 which extends upwardly to the upper end 26 of the housing 8. The bores 50 and 54 form an upwardly facing circumferential shoulder 56 in the lower portion of the housing 8. A ring of insulating material 58, such as fiber board, is disposed on the shoulder 56, and a sleeve of insulating material 60 extends upwardly from the ring 58 along the wall of the bore 54. The sleeve 60 extends upwardly through approximately three-fourths the length of the bore 54. The insulating material 58 and 60 is provided to insulate a magnetic unit, generally indicated at 62, from the housing 8, and therefore the earth, as will be more fully hereinafter set forth.

The magnetic unit 62 comprises a circular plate or head 64 of magnetic material, such as soft iron, having high permeability and low retentivity characteristics. The head 64 is of a size to fit snugly in the insulating sleeve 60 and rest on the insulating ring 58. A circumferential shoulder 66 is formed on the upper face of the head 64 to separate a sleeve 68 from a permanent magnet core 70. The sleeve 68 is also formed out of a magnetic material having high permeability and low retentivity characteristics, and is press fitted around the shoulder 66 in direct contact with the upper face of the head 64. Also, the sleeve 68 is of a diametrical size to fit snugly in the insulating sleeve 60 and is of a length that its upper end 72 is conterminous with the upper end of the insulating sleeve 60. The core 70 is formed out of magnetic material having high retentivity properties and is press fitted in the shoulder 66 of the head 64. It will also be noted that the core 70 is of a lesser length than the sleeve 68 to position the upper end 74 of the core 70 downwardly from the upper end 72 of the sleeve 68.

It will thus be apparent that the sleeve 68, head 64, and core 70 form a portion of a magnetic path wherein the upper end portion 74 of the core 70 will be of one polarity and the adjacent portion of the sleeve 68 will be of an opposite polarity. For example, if the core 70 is magnetized in such a manner that the upper end portion 74 thereof is considered the south pole of the core, then the portion of the sleeve 68 surrounding the upper portion 74 of the core 70 will be considered as a north pole. Therefore, magnetic flux will tend to flow through the air gap 76 between the upper end of the core 70 and the upper portion of the sleeve 68.

In magnetizing the core 70, the uper end portion 74 is cross-polarized, that is, the dipoles at the upper end portion 74 are arranged radially with respect to the core 70. Therefore, magnetic flux will tend to flow radially through the air gap 76 between the outer periphery of the core 70 in the area of its upper end and the inner periphery of the sleeve 68 directly opposite the upper end portion 74. Hence, magnetic flux will be concentrated in the air gap 76 through an area surrounding the upper end portion 74 of the core 70. This type of magnetization may be contrasted with the usual type wherein a magnet core is magnetized in an axial direction. When a core is magnetized in an axial direction, the magnetic flux is dispersed over a larger portion of the air gap, and is not as concentrated in the desired area, as in the present invention.

The present magnetization of the core 70 may be readily accomplished by use of an impulse magnetizer (not shown) in combination with a soft iron ring (not shown). The magnetizing or current coil of the impulse magnetizer is inserted in the air gap 76 adjacent the shoulder 66, and the soft iron ring is placed in the air gap 76 around the outer end portion 74 of the core 70. An intense current pulse (several thousand amperes) is then circulated through the current coil for a brief period of time (several milliseconds). The soft iron ring directs the magnetizing current in a radial direction at the upper end portion 74 of the core 70 to arrange the dipoles of the core 70 in radial directions as set forth above. The effect of this type of magnetization is graphically illustrated in Figure 4 with respect to the outer sleeve 68 and core 70.

Figures 4, 6:
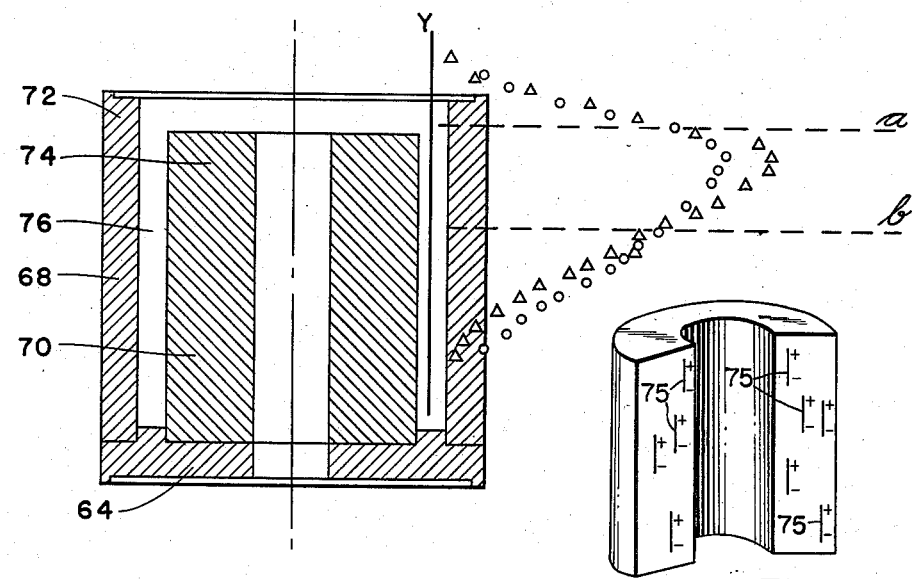
Figure 4 is a diagrammatic illustration of the seisphone magnet and sleeve illustrating the flux concentration with various types of magnetization of the magnet core.
Figure 6 is a diagrammatic view of a seisphone magnet (with a segment cut away for clarity) illustrating the arrangement of the dipoles after magnetization in an axial direction.

In Figure 4 the curves indicate the flux concentration with respect to the core 70 and sleeve 68 for different types of magnetization. As the curves extend to the right of the sleeve 68, it indicates that the magnetic flux is more concentrated along the vertical line Y at that particular height. Lines $a$ and $b$ designate the upper and lower limits, respectively, of the movement of the induction coil, as will be more fully hereinafter set forth. The curve formed by circles indicates the flux concentration when the core 70 is magnetized by use of an ordinary electromagnetic circuit using an external current coil, but without the use of a soft iron ring as mentioned above. The curve formed by small triangles indicates the flux concentration when the core 70 is magnetized by use of an impulse magnetizer having an internal current coil, and with the use of a soft iron ring around the end portion 74 of the core 70. The curves shown in Figure 4 were obtained by use of an exploring coil moved through the air gap 76 along the line Y.

Figure 7:
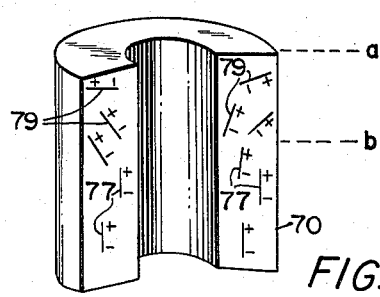
Figure 7 is a diagrammatic view of our seisphone magnet (with a segment cut away for clarity) illustrating the arrangement of the dipoles therein.

It will be apparent from Figure 4 that the greatest flux concentration in the desired area (around the outer end portion 74 of the core 70) is obtained when the core 70 is cross-magnetized, or cross-polarized at its outer end, that is, when the dipoles of the outer end portion 74 are arranged radially. The contrast between normal magnetization of a cylindrical core member and the magnetization of the core 70 of our seisphone is clearly illustrated in Figures 6 and 7. In Figure 6 the dipoles 75 are all substantially arranged in a direction parallel to the axis of the element while in Figure 7 the dipoles 77 in the area below the line b, which represents the lowest limit of travel of the coil 96, are similarly substantially parallel to the axis of the element. In the area between the lines a and b, where radial magnetization has been imposed, the dipoles 79 are arranged in a substantially radially outward direction thus increasing the flux density in the area cut by the coil. As a result, an inductance coil moving between lines a and b will cut more lines of flux and produce a more sensitive instrument, as will now be described.

Referring again to Figure 3, it will be observed that the head 64 and core 70 are provided with communicating longitudinal bores 80 having a tube 82 of suitable lightweight non-magnetic material, such as aluminum, extending loosely therethrough. The tube 82 is resiliently supported in the bores 80 by a lower spring 84 and an upper spring 86. Each of the springs 84 and 86 is of substantially circular construction and is anchored to the respective end of the magnetic unit 62. The lower spring 84 extends outwardly into a counter-bore 88 formed in the lower end face of the head 64 and is retained between the head 64 and the insulating ring 58. The upper spring 86 extends outwardly into a counter-bore 90 formed in the upper end 72 of the sleeve 68 and is secured in the counter-bore 90 by a cap 92 of suitable conducting material, such as brass. Thus, the tube 82 is resiliently anchored to the opposite ends of the magnetic unit 62, whereby the movement of the tube 82 will be dampened upon vibration of the housing 8 and magnetic unit 62.

A spindle or form 94 is rigidly secured to the upper end of the tube 82 and extends downwardly in the air gap 76 around the upper end portion 74 of the core 70. The spindle 94 is preferably formed out of the same material as the tube 82. An inductance coil 96 is wound around the spindle 94 and normally extends from a point slightly above the upper end portion 74 of the core 70 downwardly into the air gap 76 around the core 70. Obviously, the spindle 94 and coil 96 move with the tube 82 and are subject to the action of the springs 84 and 86. One lead 97 of the coil 96, such as the center lead of the coil, extends upwardly through the cap 92 and is connected to one of the cable conductors 43 (see also Figures 2 and 5). The opposite or outer coil lead 98 extends through the cap 92 and is connected to the conductor 43 of another cable 42. Suitable insulators 100 extend through the cap 92 to receive the coil leads 97 and 98 to insulate the coil leads from the cap 92. It will also be noted that the lead or conductor 46, which connects with the ground conductor 44, is secured directly to the cap 92 in any suitable manner, such as by soldering.

A suitable cap 102, preferably formed of plastic, is secured in the upper end 26 of the housing 8 and has a circumferential groove 104 in the lower outer end thereof. The groove 104 receives a sealing ring 106, such as an O ring, for sealing the cap 102 to the walls of the housing bore 54 and to the upper end 72 of the sleeve 68. Thus, moisture or dust can not reach the magnetic unit 62 to interfere with the operation of the coil 96. An internal circumferential groove 108 is provided in the upper end portion 26 of the housing 8, and a mating groove 110 is formed in the outer periphery of the cap 102 to receive a split locking ring 112. A portion 114 of the upper end 26 of the housing 8 is cut away, as also illustrated in Figure 2, to a point below the groove 108 to receive the out-turned ends 116 of the locking ring 112. Thus, the tabs or out-turned ends 116 of the locking ring 112 may be easily grasped upon removal of the cap 30 of the protective case 12, whereby the ring 112 may be reduced in diameter and forced into the groove 110 of the cap 102. Whereupon, the locking ring 112 will be out of engagement with the housing 8 and the cap 102 may be easily removed for inspection of the magnetic unit 62.

The leads or conductors 97, 98, and 46 extend through apertures 118 formed through the walls of the cap 102 and then through the slot 114 of the housing 8, as illustrated in Figure 3, for connection with the conductors 43 and 44. The apertures 118 extend through the cap 102 above the sealing ring 106, but preferably below the locking ring 112. Thus, any moisture which may enter through the apertures 118 will be stopped by the sealing ring 106, yet the locking ring 112 may be easily operated without interference from the conductors 97, 98, and 46. Sufficient slack will be provided in the conductors 97, 98 and 46 to permit removal of the cap 102 sufficiently far for inspection of the magnetic unit 62 without the necessity of severing the conductors.

Figure 5:
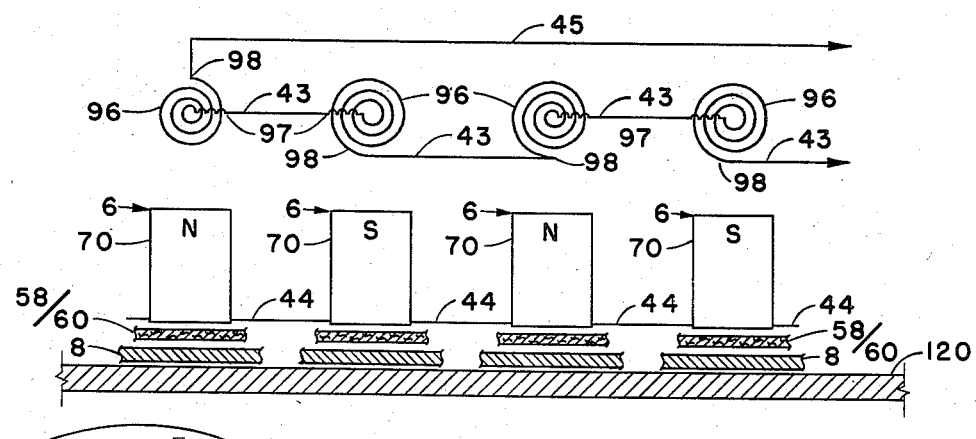
Figure 5 is another diagrammatical drawing illustrating the interconnection of an array of seisphones.

When a plurality of seisphones 6 are used in a string or array for seismic surveying, they will be interconnected and arranged as diagrammatically illustrated in Figure 5. The return conductor 45 is connected to the outer lead 98 of the coil 96 on the outermost seisphone 6 (the left-hand seisphone as shown in Figure 5) and extends directly to the recording apparatus (not shown) without connection with the remaining seisphones 6. The outermost conductor 43 connects the inner lead 97 of the outermost coil 96 to the inner lead 97 of the adjacent coil 96. The next conductor 43 connects the outer lead 98 of the next-to-the-outermost coil 96 with the outer lead 98 of the adjacent coil 96. The remaining conductors 43 interconnect the remaining coils 96 in a like manner. Therefore, the coils 96 are interconnected in reverse fashion to overcome the influence of external electromagnetic fields generated by power lines and the like. These external electromagnetic fields ordinarily extend over an area greater than the distance between adjacent seisphones 6. Therefore, the flux of the external electromagnetic fields will be cut by adjacent coils 96 in a reverse direction to cancel out the E.M.F generated in each particular coil 96. The innermost conductor 43 is, of course, connected to the recording apparatus to cooperate with the conductor 45 in transmitting electrical energy generated in the coils 96 upon vibration of the seisphones 6, as will be hereinafter set forth.

As a result of the reverse connection of adjacent coils 96, the adjacent magnets 70 are reversed, polarity-wise, as illustrated in Figure 5. That is, if the outermost magnet 70 has its north pole extending upwardly, the adjacent magnet 70 has its south pole extending upwardly. Therefore, the outermost coil 96, when moving with respect to the north pole of the outermost magnet 70, will generate an electrical current in the same direction as the adjacent reverse-connected coil 96 moving along the south pole of its respective magnet 70. It will thus be seen that the electrical current generated by each of the coils 96 will be in the same direction to provide an addition of the signal picked-up by each of the seisphones 6.

As diagrammatically illustrated in Figure 5, the insulation 58 and 60 shields the magnet 70 of each seisphone 6 from its housing 8 and the earth 120. Thus, ground currents will not be transmitted directly to any of the seisphones 6. The conduits 44 interconnect the magnetic units 62 of the seisphones 6, and the innermost conductor 44 is connected to the ground frame of the recording apparatus. Therefore, the seisphones 6 will be collectively grounded to overcome any influence of electromagnetic fields caused by ground currents being transmitted through the earth 120.

In operation of the seisphones 6, a plurality of the seisphones are interconnected as diagrammatically illustrated in Figure 5. The spike 10 of each seisphone 6 is then inserted in the earth 120 to couple the seisphone to the earth. Since the seisphones 6 are sturdily constructed, the spikes 10 may be conveniently inserted in the earth by stepping on the cap 30 of the respective seisphone. When the earth 120 is vibrated, each of the housings 8 and magnetic units 62 will be vibrated in a like manner. The coil 96 of each seisphone 6 will also be vibrated. However, since the coils 96 are resiliently supported, a relative movement will take place between each coil 96 and its magnetic unit 62. Thus, each coil 96 will cut the magnetic flux present in the respective air gap 76, between the lines a and b as shown in Figure 4, to generate an E.M.F. and produce an electrical signal in the leads 97 and 98. These electrical signals are added through the conductors 43 and 45, as previously set forth, and are recorded by a suitable recording apparatus.

When removing the seisphones 6 to another location, they may be raised to remove the spikes 10 from the earth 120 by merely pulling upwardly on the cables 42. The seisphones 6 may then be transported to a new location where the spikes 10 are again inserted in the earth 120 and the seismic exploration procedure repeated. The protective case 12 and cap 30 adequately protect the internal structure of each seisphone 6 from damage due to accidental blows or the like, and the protective case, in combination with the sealing ring 106, prevents the entrance of moisture to the magnetic units 62 and coils 96.

From the foregoing, it will be apparent that the present invention provides a simply constructed seisphone which may be economically manufactured. The seisphone has a controlled magnetic circuit whereby the magnetic flux is concentrated in the desired area to provide a highly sensitive instrument without exhorbitant manufacturing costs. A plurality of the detectors may be readily interconnected in such a manner as to be insensitive to external electromagnetic fields, as well as ground currents. The seisphone case is sturdily constructed to withstand rough handling, as well as being moisture-proof, to permit usage of the seisphone in substantially any kind of weather conditions. Also, the seisphone protective case is constructed integrally with the interconnecting cable and may be easily opened for repair or inspection of the seisphone structure.

Changes may be made in the combination and arrangement of parts as heretofore set forth in the specification and shown in the drawings, it being understood that changes may be made in the precise embodiment shown without departing from the spirit of the invention as set forth in the following claims.

We claim:

1. In a seisphone, a sleeve of magnetic material, a head of magnetic material secured on one end of said sleeve, a core of magnetic material extending from said head inside of and in inwardly spaced relation to said sleeve, said core, head, and sleeve forming a portion of a magnetic path with said core and head forming parallel portions of the path, one of said parallel path portions being permanently magnetized to arrange the dipoles thereof in a radial direction over a peripheral area adjacent the opposite parallel path portion and concentrate magnetic flux between said parallel path portions opposite said area, and a coil resiliently supported between said core and sleeve in the area of flux concentration.

2. In a seisphone, a sleeve of magnetic material, a head of magnetic material secured on one end of said sleeve, a magnet core extending from said head inside of and in inwardly spaced relation to said sleeve, and a coil resiliently supported between said core and sleeve, the dipoles of said magnet core being permanently arranged in a radial direction adjacent said coil, whereby magnetic flux is concentrated between said core and sleeve in the area of said coil.

3. In a seisphone array for use with a recording apparatus having a ground connection, a plurality of seisphones, each of said seisphones comprising a hollow housing, an earth coupling spike on the lower end of said housing, said housing having an upwardly facing circumferential shoulder in the lower portion thereof, a ring of insulating material on said shoulder, a sleeve of insulating material extending upwardly from said shoulder in contact with the inner wall of said housing, a magnetic unit supported in said sleeve on said ring out of contact with said housing, an inductance coil resiliently supported in said housing and extending into said magnetic unit, and a conduit insulated from each of said housings interconnecting each of said magnetic units with the ground connection of the recording apparatus.

4. A protective case and cable construction for a seisphone housing, comprising a pliable material case having a vertical bore therethrough of a size to receive the seisphone housing, said case having an external circumferential groove in the lower end portion thereof, a band pressed into said groove for retaining said case on said seisphone housing, a pair of arms formed integrally with said case and extending outwardly from opposite sides of said case, each of said arms having a bore extending from the outer end thereof into proximity with the vertical bore of said case, a cable bonded in each of said bores of said arms, said case also having an external circumferential lip on the upper end thereof above said arms, a pliable material cap of a size to telescope over said lip and having an internal flange in the lower end thereof of a size to extend under said lip, said cap also having an external circumferential grove opposite said flange, and a locking band pressed into said last-mentioned groove for retaining said flange under said lip and preventing removal of said cap from said case.

5. In a seisphone array, a plurality of seisphones, a permanent magnet in each of said seisphones, the magnets in adjacent seisphones being arranged in reversed polar directions, an inductance coil in each of said seisphones resiliently supported in the magnetic field of the respective magnet and having an inner and a outer lead, said inductance coils in adjacent seisphones being supported in oppositely generated magnetic fields, and conductors interconnecting the center lead of each coil with the center lead of an adjacent coil on one side thereof and connecting the outer lead thereof with the outer lead of an adjacent coil on the opposite side thereof, whereby currents generated by external electromagnetic fields cutting said coils will be cancelled and currents generated by said coils cutting the magnetic fields produced by the various permanent magnets will add.

6. In a seisphone, a sleeve of magnetic material, a magnet core disposed in said sleeve in inwardly-spaced relation to said sleeve to provide an annular space between said sleeve and said core, a head of magnetic material connecting one end of said sleeve to one end of said core to form a portion of a magnetic path between said core, head, and sleeve, the magnetic orientation of the material at the opposite end portion of said core being such that the flux emanating therefrom takes a radial path, and a coil element resiliently supported in said annular space adjacent said opposite end portion of said core.

7. A seisphone as defined in claim 6 characterized further in that said coil element is resiliently supported by said sleeve.

8. In a seisphone, a head of magnetic material, a permanent magnet core secured at one end to said head, the magnetic orientation of the material at the opposite end portion of said core being such that the flux emanating therefrom takes a radial path, a sleeve of magnetic material telescoped over said core and secured to said head, said core and sleeve being of such relative sizes as to provide an annular gap therebetween, said core and head having communicating bores therethrough, a non-magnetic coil support extending loosely through said bore, springs connecting the opposite ends of said coil support to the opposite end portions of said sleeve, a spindle carried by said coil support and extending into said gap around said opposite end portion of said core, and an inductance coil wound on said spindle.

References Cited in the file of this patent

UNITED STATES PATENTS

| | | |
|---|---|---|
| 1,980,993 | Hayes | Nov. 20, 1934 |
| 2,271,864 | Honnell et al. | Feb. 3, 1942 |
| 2,348,225 | Petty | May 9, 1944 |
| 2,440,903 | Massa | May 4, 1948 |
| 2,477,172 | Brownlow | July 26, 1949 |
| 2,601,543 | McLoad | June 24, 1952 |